United States Patent
Bernhagen et al.

(10) Patent No.: US 8,195,365 B2
(45) Date of Patent: Jun. 5, 2012

(54) OPERATOR RESTRAINT SYSTEM

(75) Inventors: James Robert Bernhagen, Cary, NC (US); Robert Quincy Elliott, Cary, NC (US); John Martin Hadank, Peoria, IL (US); David James Edwards, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 672 days.

(21) Appl. No.: 12/289,890

(22) Filed: Nov. 6, 2008

(65) Prior Publication Data

US 2010/0114436 A1    May 6, 2010

(51) Int. Cl.
    B60R 22/48    (2006.01)
(52) U.S. Cl. ............... 701/45; 280/801.1; 340/457.1
(58) Field of Classification Search ............ 701/45; 280/801.1, 808; 297/468.4, 474, 475, 483; 242/383.1, 384.1; 340/457.1
See application file for complete search history.

(56) References Cited

U.S. PATENT DOCUMENTS

| | | | | |
|---|---|---|---|---|
| 4,107,645 | A * | 8/1978 | Lewis et al. ............... | 180/270 |
| 4,346,778 | A * | 8/1982 | Bluggel et al. ............ | 180/268 |
| 6,203,059 | B1 * | 3/2001 | Mazur et al. .............. | 280/735 |
| 6,215,395 | B1 * | 4/2001 | Slaughter et al. ......... | 340/457.1 |
| 6,278,358 | B1 | 8/2001 | Spoto et al. | |
| 6,282,473 | B1 | 8/2001 | Steffens, Jr. | |
| 6,362,734 | B1 * | 3/2002 | McQuade et al. ......... | 340/457.1 |
| 6,422,595 | B1 * | 7/2002 | Breed et al. .............. | 280/735 |
| 6,439,333 | B2 * | 8/2002 | Domens et al. ........... | 180/268 |
| 6,443,488 | B1 | 9/2002 | Kippelt et al. | |
| 6,517,107 | B2 | 2/2003 | Johnson et al. | |
| 6,750,764 | B1 | 6/2004 | Henninger | |
| 6,809,640 | B1 * | 10/2004 | Sherman ................... | 340/457.1 |
| 6,853,298 | B1 | 2/2005 | Stojanowski | |
| 6,854,415 | B2 | 2/2005 | Barnes et al. | |
| 6,924,742 | B2 * | 8/2005 | Mesina ..................... | 340/573.1 |
| 7,011,341 | B2 * | 3/2006 | Herberg et al. ........... | 280/807 |
| 7,242,286 | B2 | 7/2007 | Knox | |
| 7,299,119 | B2 | 11/2007 | Sugiura | |
| 7,403,106 | B2 | 7/2008 | Yanagi | |
| 2004/0036345 | A1 * | 2/2004 | Herberg et al. ........... | 297/480 |
| 2005/0206152 | A1 * | 9/2005 | Delventhal et al. ........ | 280/805 |
| 2006/0095184 | A1 * | 5/2006 | Gray et al. ................ | 701/45 |
| 2006/0180764 | A1 | 8/2006 | Yajima et al. | |
| 2007/0021892 | A1 | 1/2007 | Takemura | |
| 2007/0284868 | A1 * | 12/2007 | Odate ....................... | 280/801.1 |
| 2008/0088426 | A1 | 4/2008 | Lima et al. | |
| 2008/0157510 | A1 | 7/2008 | Breed et al. | |
| 2008/0169916 | A1 | 7/2008 | Lai | |
| 2008/0178045 | A1 | 7/2008 | Son | |
| 2009/0020997 | A1 * | 1/2009 | Odate ....................... | 280/801.1 |
| 2009/0112408 | A1 * | 4/2009 | Kankanala et al. ....... | 701/45 |
| 2009/0309346 | A1 * | 12/2009 | Van Druff et al. ........ | 280/806 |

* cited by examiner

*Primary Examiner* — Paul N Dickson
*Assistant Examiner* — George Spisich
(74) *Attorney, Agent, or Firm* — Finnegan, Henderson, Farabow, Garrett & Dunner LLP

(57) ABSTRACT

An operator restraint system is provided. The operator restraint system includes a seatbelt payout sensor and a seatbelt buckle assembly. The seatbelt buckle assembly includes a housing and an alarm assembly. The alarm assembly includes at least one of a light source configured to generate a visible signal and an annunciator configured to generate an audible signal. A controller is associated with at least one of the seatbelt payout sensor and the alarm assembly. The controller is configured to receive from the seatbelt payout sensor a signal indicative of a length of a seatbelt that has been withdrawn, determine whether the length of the seatbelt that has been withdrawn is within a predetermined range, and control the alarm assembly to selectively generate at least one of the visible signal and the audible signal to remind an operator regarding employment of the seatbelt based on the determination.

12 Claims, 3 Drawing Sheets

OPERATOR RESTRAINT SYSTEM

TECHNICAL FIELD

The present disclosure relates generally to a restraint system and, more particularly, to an operator restraint system.

BACKGROUND

Operator restraint systems that include a seatbelt have been widely employed in machines, such as construction equipment, mobile vehicles, etc., to protect operators during operations of these machines. In some circumstances, operators either do not buckle the seatbelt, or they buckle the seatbelt incorrectly. Various operator restraint systems have been developed to detect whether the seatbelt is buckled, and to generate warning signals, such as visible and/or audible signals, to remind the operators to employ the seatbelt during machine operation. However, some conventional operator restraint systems can be bypassed by the operator, for example, by buckling the seatbelt behind his/her back. In such a situation, the seatbelt may be buckled, but it may be buckled in an incorrect manner. Conventional operator restraint systems may fail to detect such a situation. A seatbelt buckled behind an operator's back will be ineffective to render protection to the operator.

A safety belt warning device is described in U.S. Patent Application Publication No. 2008/0169916 A1 (the '916 publication) to Lai published on Jul. 17, 2008. The safety belt warning device of the '916 publication includes a warning member electrically coupled to a sensing member. The sensing member includes a magnetic element installed on a first buckle member of a safety belt buckle and a magnetically-activated control element installed on a second buckle member of the safety belt buckle. The warning member generates a warning signal in the form of sound, light, or both, when the first buckle member and the second buckle member are not engaged.

Although the safety belt warning device of the '916 publication may provide reminders to an operator for buckling the safety belt, it may be problematic in some situations. For example, the operator may buckle the belt behind his/her back, and the safety belt warning device of the '916 publication may be ineffective in detecting that the safety belt has not been properly employed.

The present disclosure is directed toward improvements in the existing technology.

SUMMARY

In one aspect, the present disclosure is directed to an operator restraint system. The operator restraint system includes a seatbelt payout sensor and a seatbelt buckle assembly. The seatbelt buckle assembly includes a housing and an alarm assembly. The alarm assembly includes at least one of a light source configured to generate a visible signal and an annunciator configured to generate an audible signal. A controller is associated with at least one of the seatbelt payout sensor and the alarm assembly. The controller is configured to receive from the seatbelt payout sensor a signal indicative of a length of a seatbelt that has been withdrawn, determine whether the length of the seatbelt that has been withdrawn is within a predetermined range, and control the alarm assembly to selectively generate at least one of the visible signal and the audible signal to remind an operator regarding employment of the seatbelt based on the determination.

In another aspect, the present disclosure is directed to an operator restraint system that includes a seatbelt payout sensor located adjacent a seatbelt spool. The seatbelt payout sensor is configured to measure a length of a seatbelt that has been withdrawn and generate a signal indicative of the withdrawn length. The operator restraint system also includes a seatbelt buckle assembly. The seatbelt buckle assembly includes a housing and an alarm assembly. The alarm assembly includes at least one of a light source and an annunciator. The operator restraint system further includes a controller associated with at least one of the seatbelt payout sensor and the alarm assembly. The controller is configured to receive the signal generated by the seatbelt payout sensor, determine whether the withdrawn length of the seatbelt is within a predetermined range, and control the alarm assembly to selectively generate at least one of a visible signal and an audible signal to remind an operator regarding employment of the seatbelt based on the determination.

DETAILED DESCRIPTION

Figure 1:
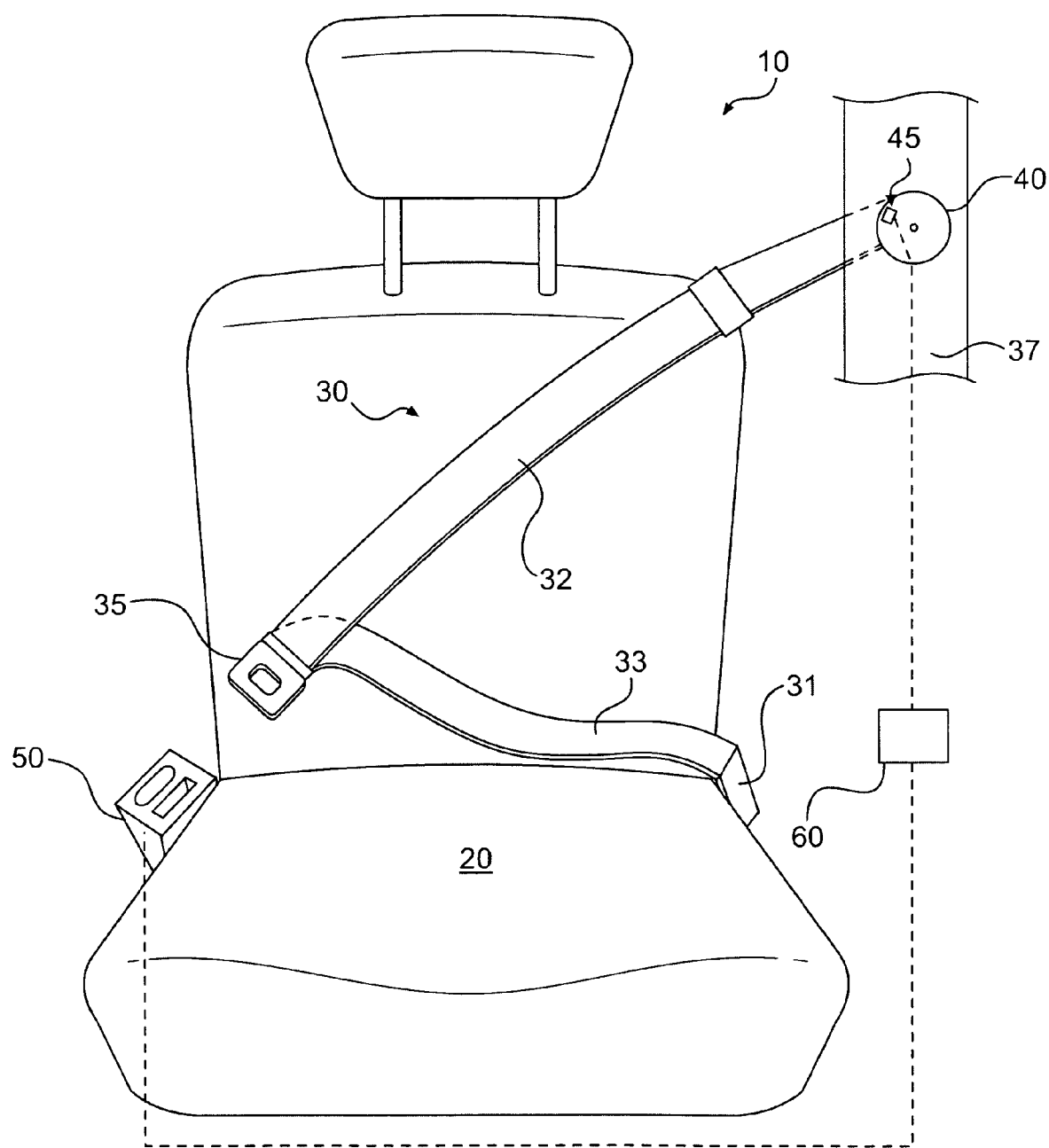
FIG. 1 is a schematic illustration of an exemplary operator restraint system.

FIG. 1 is a schematic illustration of an exemplary operator restraint system 10. The operator restraint system 10 may be employed in any machine, such as a mobile vehicle, a construction machine, etc., to provide protection to an operator of such a machine. The operator restraint system 10 may include a seat 20 for the operator. A seatbelt 30 may be provided with the seat 20. The seatbelt 30 may be wound on a seatbelt spool 40, which may be disposed within a frame 37 of the machine. In some embodiments, although not shown, the seatbelt spool 40 may be disposed within the seat 20, or at any other suitable location of the machine. The seatbelt 30 may be fixed at one end through a fixture 31 installed adjacent one side of the seat 20, for example. A tongue 35 may be disposed on the seatbelt 30. The location of the tongue 35 along the seatbelt 30 may be adjustable.

A seatbelt buckle assembly 50 may be disposed adjacent one side of the seat 20 opposite to the side where the fixture 31 is located. The seatbelt buckle assembly 50 may be configured to receive the tongue 35 and secure the seatbelt 30. Although FIG. 1 shows an exemplary three-point seatbelt system, in which the seatbelt 30 includes a shoulder seatbelt portion 32 and a lap seatbelt portion 33, the seatbelt 30 may also be used in a two-point system (not shown) that includes only a lap portion, for example. Other multiple-point systems are contemplated. The seatbelt 30 may be withdrawn from the seatbelt spool 40 for a length until the tongue 35 may be coupled with the seatbelt buckle assembly 50 to secure the seatbelt 30. It is contemplated that in a two-point system, the seatbelt spool 40 may be located on the seat 20 or adjacent the seat 20, for example, on the side of seat 20 adjacent the location of fixture 31. In some two-point systems, the fixture 31 may be integrated with the seatbelt spool 40 as a single unit. In a three-point system and other multiple-point systems, the seatbelt 30 may be stretched around the operator's shoulder, waist, chest, or other portions of the operator's body. In such a system, the seatbelt 30 may be withdrawn from the seatbelt spool 40 for a length that may be larger than that withdrawn in a two-point system in order to couple the tongue 35 with the seatbelt buckle assembly 50. Although not shown in FIG. 1, it is contemplated that the operator restraint system 10 may include other devices, such as a weight sensor and/or a temperature sensor for detecting the presence of the operator in the seat 20.

The operator restraint system 10 may also include a seatbelt payout sensor 45. The seatbelt payout sensor 45 may be disposed within the seat 20 (not shown), within a frame 37 of the machine, as shown in FIG. 1, or at any suitable location on the machine. The seatbelt payout sensor 45 may include an electrical sensor, a mechanical sensor, a magnetic sensor, an optical sensor, or any suitable sensor for measuring the length of the seatbelt 30 that is withdrawn from the seatbelt spool 40. The seatbelt payout sensor 45 may be configured to generate a signal indicative of the withdrawn length of the seatbelt 30. The signal may be transmitted from the seatbelt payout sensor 45 to a controller 60, with which the seatbelt payout sensor 45 may be connected through a wired or wireless connection. The controller 60 may be part of an existing engine control module (not shown) or may be a stand-alone control unit dedicated to the operator restraint system 10.

Figure 2A:
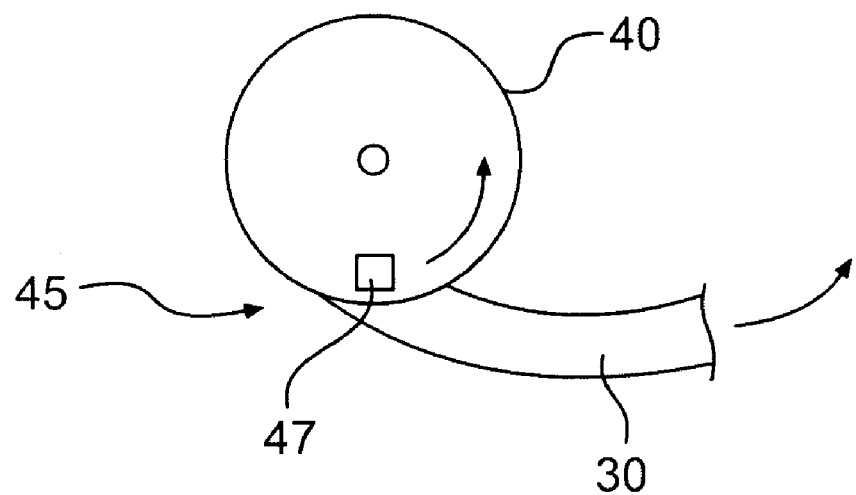
FIG. 2A is a schematic illustration of an exemplary seatbelt spool and an exemplary seatbelt payout sensor.

The seatbelt payout sensor 45 configured to measure the withdrawn length of the seatbelt 30 may be realized in various manners. For example, in some embodiments, the seatbelt payout sensor 45 may include a rotation counter 47 associated with the seatbelt spool 40, as schematically illustrated in FIG. 2A. The rotation counter 47 may be disposed on or adjacent the seatbelt spool 40. When the seatbelt 30 is withdrawn from the seatbelt spool 40, the seatbelt spool 40 rotates. The rotation counter 47 may be configured to measure the withdrawn length of the seatbelt 30 by counting the number of rotations of the seatbelt spool 40, and may generate a signal indicative of the withdrawn length of the seatbelt 30. The rotation counter 47 may send the signal to the controller 60 for further processing.

Figure 2B:
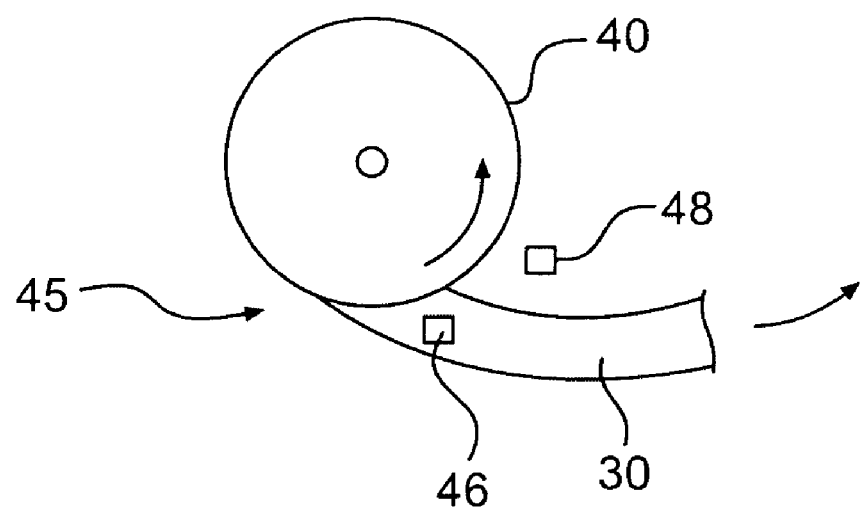
FIG. 2B is a schematic illustration of an exemplary seatbelt spool and an exemplary seatbelt payout sensor.

In some embodiments, as schematically illustrated in FIG. 2B, the seatbelt payout sensor 45 may include one or more magnetic elements 46, for example, embedded in webbing of the seatbelt 30 at one or more predetermined locations. The predetermined locations may be related to predetermined lengths of the seatbelt 30 when the seatbelt 30 is withdrawn from the seatbelt spool 40. A magnetic switch 48 may be disposed at a location adjacent the seatbelt spool 40. It is contemplated that the magnetic switch 48 may also be disposed on the seatbelt spool 40. The magnetic switch 48 may be configured to detect the one or more magnetic elements 46, for example, when the magnetic elements 46 passes by the magnetic switch 48 as the seatbelt 30 is withdrawn. The magnetic switch 48 may generate a signal indicative of the withdrawn length of the seatbelt 30, and may transmit the signal to the controller 60. The controller 60 may receive and analyze the signal, for example, to determine the withdrawn length of the seatbelt 30. Other generally conventional types of sensors, such as optical sensors may also be used as the seatbelt payout sensor 45 to measure the withdrawn length of the seatbelt 30.

Figure 3:
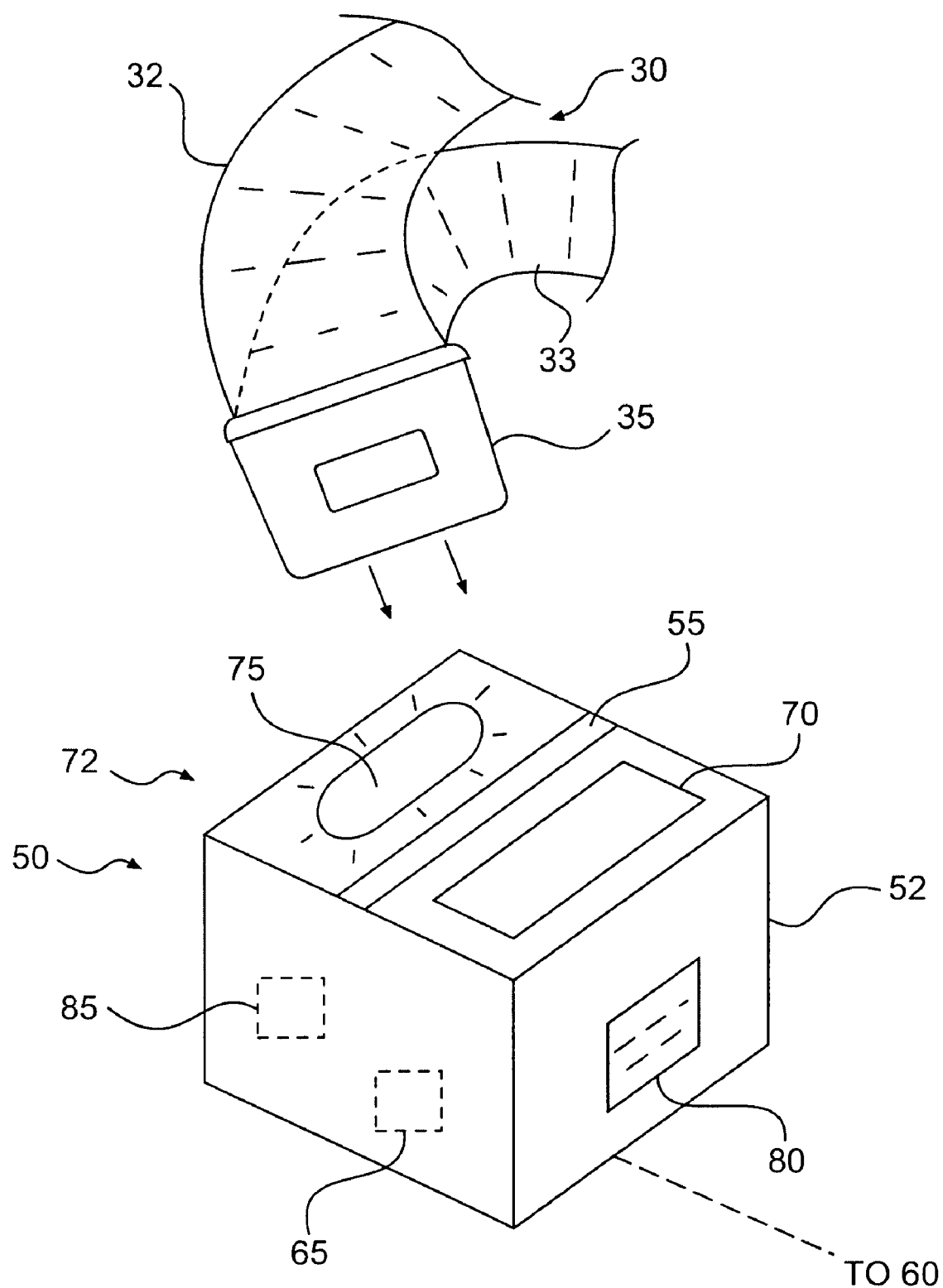
FIG. 3 is a schematic illustration of an exemplary seatbelt buckle assembly.

FIG. 3 illustrates an exemplary seatbelt buckle assembly 50. The seatbelt buckle assembly 50 may include a housing 52, which may include a cubic shape or any suitable shape, for example an irregular shape. The housing 52 may be made of any suitable materials, such as plastic, glass, etc. In some embodiments, at least a portion of the housing 52 may be made of a translucent material, such as glass. The housing 52 may include a receptacle 55 configured to receive the tongue 35 of the seatbelt 30. The tongue 35 and the receptacle 55 may be securely engaged with one another such that the seatbelt 30 is securely coupled with the seatbelt buckle assembly 50. When the tongue 35 and the receptacle 55 are securely engaged with one another, the seatbelt 30 may be referred to as being in a "buckled" state. Otherwise, if the tongue 35 and the receptacle 55 are not securely engaged with one another, the seatbelt 30 may be referred to as being in a "unbuckled" state.

An engagement detection device 65 may be disposed within the housing 52 and configured to monitor the status of the seatbelt 30, i.e., whether the tongue 35 and the receptacle 55 are securely engaged. The engagement detection device 65 may generate a signal indicative of the status of seatbelt 30, and may send the signal to the controller 60 through a wired or wireless connection. The controller 60 may determine the status of the seatbelt 30 based on the received signal. The engagement detection device 65 may include a mechanical switch, an electrical switch, or any suitable switch or sensor.

The seatbelt buckle assembly 50 may include a release button 70, which may be disposed on a suitable portion of the housing 52, for example, a top surface portion of the housing 52. When the release button 70 is pressed, the engaged tongue 35 and receptacle 55 may be disengaged such that the seatbelt 30 may be released and retracted by the seatbelt spool 40.

The seatbelt buckle assembly 50 may include an alarm assembly 72, which may be associated with the housing 52 and may include one or more components configured to selectively generate an alarm to remind the operator regarding correct employment of the seatbelt 30. For example, the alarm assembly 72 may include at least one of a light source 75 configured to generate a visible signal and an annunciator 80 configured to generate an audible signal. In some embodiments, the light source 75 may be disposed on a surface portion of the housing 52. When the light source 75 is turned on, a light is emitted from the seatbelt buckle assembly 50 and may be noticed by the operator. Thus, the light may function as an alarm to remind the operator to buckle the seatbelt 30. In some embodiments, the light source 75 may be disposed at least partially within the housing 52. When at least a portion of the housing 52 is made of a translucent or transparent material, such as glass, the light source 75 may illuminate at least the translucent or transparent portion of the housing 52, which may be noticed by the operator. It is contemplated that the light source 75 may be disposed at any location suitably within visible range of the operator.

The annunciator 80 may generate an audible signal, such as a sound, a tone, a voice message, etc. The annunciator 80 may include a speaker, a buzzer, or any device that may generate an audible signal. The annunciator 80 may be disposed within or adjacent the housing 52, or may be disposed at a location suitably within hearing range of the operator. It is contemplated that the housing 52 may further include an audio port to which an external annunciator may be connected. The external annunciator may generate an audible signal to warn a person, such as a supervisor who may be supervising the operator's work, when the seatbelt 30 is not buckled or buckled incorrectly. The annunciator 80 may be associated with the controller 60, e.g., through a wired or wireless connection. The annunciator 80 may be controlled by the controller 60 for generating audible signals. The controller 60 may control the durations of time, the volume, and/or the types of audible signals that are generated by the annunciator 80. For example, an audible signal may be maintained active for 10 seconds, 20 seconds, etc. A plurality of audible signals may be generated, as determined by the controller 60, in a random or sequential order. For example, the controller 60 may control the annunciator 80 to generate a first tone, such as a gentle tone, for a first predetermined duration of time, e.g., 20 seconds. If the seatbelt 20 is still in an unbuckled state or is buckled incorrectly, the gentle tone may be repeated, for example, once, twice, or any predetermined number of times, or for a second predetermined duration of time, e.g., 10 seconds. In some embodiments, the annunciator 80 may generate a second tone, such as a more urgent tone, for the second predetermined duration of time if the seatbelt 30 is still unbuckled or buckled incorrectly after the first predetermined duration of time has elapsed.

The seatbelt buckle assembly 50 may also include a timer 85. The timer 85 may be associated with at least one of the light source 75, the annunciator 80, the engagement detection device 65, and the controller 60, through wired or wireless connections. For example, the timer 85 may track the time elapsed from the start of the machine and the detection of the engagement of the tongue 35 and the receptacle 55 by the engagement detection device 65. The controller 60 may control the ON/OFF status of the timer 85. The controller 60 may also preset durations of time for the timer 85 for various operations of the components of the alarm assembly 72. The timer 85 may control the activation and/or deactivation of the components of the alarm assembly 72 based on the preset durations of time. For example, the timer 85 may control activation of a visible signal generated by the light source 75 for 10 seconds, and/or an audible signal generated by the annunciator 80 for 20 seconds.

An existing power source (not shown) of the machine may be used to provide power to the various devices of the seatbelt buckle assembly 50, such as the light source 75, the annunciator 80, and the timer 85. Alternatively, a dedicated power source (not shown), such as a battery may be used. The battery may be disposed within the housing 52, or externally to the housing 52.

Industrial Applicability

Referring to FIGS. 1-3, when an operator is seated in the seat 20 and the machine is turned on, the operator restraint system 10 may be activated. In exemplary embodiments, the light source 75 may be activated, e.g., by the controller 60, after the machine is turned on, while the annunciator 80 may not be activated. The light source 75 may emit a light to remind the operator to buckle the seatbelt 30. If the status of the seatbelt 30 remains unbuckled, as detected by the engagement detection device 65, the light source 75 may be maintained active for a predetermined duration of time, for example, 30 seconds, which may be preset in the timer 85. Alternatively, the light source 75 may be maintained active until the seatbelt 30 is buckled. In some embodiments, if a predetermined period of time, e.g., 10 seconds, has elapsed after the light source 75 is activated and the seatbelt 30 remains unbuckled, the controller 60 may activate the annunciator 80 to generate one or more audible signals to remind the operator. The annunciator 80 may be maintained active for generating the audible signals for a predetermined duration of time, e.g., 2 minutes, which may be preset in the timer 85, or until the seatbelt 30 is buckled.

In some embodiments, the annunciator 80 may be activated simultaneously with the light source 75 after the machine is turned on. In such a situation, the light source 75 and the annunciator 80 may generate visible and audible signals simultaneously to remind the operator to secure the seatbelt 30. In some embodiments, the activation of the light source 75 and the annunciator 80 may be delayed for a predetermined duration of time, e.g., 10 seconds, after the machine is turned on. The predetermined duration of time for delay may be preset in the timer 85, e.g., by the controller 60. In such embodiments, if the seatbelt 30 is correctly buckled within the predetermined duration of time after the machine is turned on, the light source 75 and the annunciator 80 may be maintained inactive.

In some embodiments, the annunciator 80 may be activated with a time delay, e.g., 10 seconds, after the light source 75 has been activated after the machine is turned on. The time delay may be preset in the timer 85, e.g., by the controller 60. Within the time delay, the light source 75 may generate a visible signal to remind the operator to secure the seatbelt 30. If the seatbelt 30 is correctly buckled within the time delay period after the machine is turned on, the annunciator 80 may be maintained inactive. If the seatbelt 30 is not buckled or is not correctly buckled after the time delay has elapsed after the machine is turned on, the annunciator 80 may be activated to generate an audible signal to remind the operator to correctly buckle the seatbelt 30.

In some embodiments, the light source 75 may be deactivated when the engagement detection device 65 detects that the seatbelt 30 is buckled. In some embodiments, the light source 75 may be maintained active until it is determined that the seatbelt 30 is correctly buckled. When the seatbelt is buckled, the engagement detection device 65 may send a signal to the controller 60 indicating the status of the seatbelt 30. In the meantime, the seatbelt payout sensor 45 may generate a signal indicative of the length of the seatbelt 30 that has been withdrawn and may send the signal to the controller 60. The controller 60 may analyze the signal received from the seatbelt payout sensor 45 and determine whether the length of the seatbelt 30 that has been withdrawn is within a predetermined range. If the withdrawn length is within the predetermined range, which may indicate a situation in which the seatbelt 30 is incorrectly buckled behind the operator's back, for example, the controller 60 may control the alarm assembly 72 to selectively generate or maintain at least one of the visible signal and the audible signal to remind the operator regarding employment of the seatbelt 30. For example, the controller 60 may selectively activate or reactivate the light source 75 and/or the annunciator 80, or selectively maintain the active status of the light source 75 and/or the annunciator 80, to generate visible and/or audible signals to remind the operator regarding correct employment of the seatbelt 30.

The visible and/or audible signals may be selectively maintained active until a predetermined duration of time has elapsed. The predetermined duration of time may be any suitable period, for example, 1 minute, 10 minute, etc., and may be determined by the controller 60 and preset in the timer 85. The predetermined duration of time for maintaining the visible signal may be different from the predetermined duration of time for maintaining the audible signal. After the predetermined duration of time has elapsed, the light source 75 and/or the annunciator 80 may be deactivated, e.g., by the controller 60. Alternatively, in some embodiments, the visible and/or audible signals may be selectively maintained active until the seatbelt 30 is correctly buckled. The seatbelt 30 may be determined to be correctly buckled if the seatbelt 30 is buckled, as detected by the engagement detection device 65, and if the withdrawn length of the seatbelt 30 is not within the predetermined range, as indicated by the signal generated by the seatbelt payout sensor 45.

The predetermined range for the withdrawn length of the seatbelt 30 should be different from the withdrawn length when the seatbelt 30 is correctly buckled since it typically requires only a minimum length of the seatbelt 30 to be withdrawn in order to buckle the seatbelt 30 behind an operator's back. Thus, when the seatbelt 30 is buckled behind the operator's back, the withdrawn length of the seatbelt 30 is within the predetermined range. When the seatbelt 30 is incorrectly buckled behind the operator's back, the controller 60, along with the seatbelt payout sensor 45, may detect such a situation although the seatbelt 30 may be secured with the seatbelt buckle assembly 50. The controller 60 may subsequently control the alarm assembly 72 to selectively generate audible and/or visible signals to remind the operator to correctly buckle the seatbelt 30.

The disclosed operator restraint system 10 may be employed in systems and machines where a seatbelt is used for protecting an operator. With the seatbelt payout sensor 45, the controller 60, and the seatbelt buckle assembly 50 including the alarm assembly 72, situations where the seatbelt is incorrectly buckled, for example, behind an operator's back, may be detected and prevented by generating alarm signals in the form of light and/or sound to remind the operator. The disclosed operator restraint system 10 may improve the effectiveness of the seatbelt.

It will be apparent to those skilled in the art that various modifications and variations can be made in the disclosed operator restraint system. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. An operator restraint system, comprising:
a seatbelt payout sensor located adjacent a seatbelt spool and configured to measure a length of a seatbelt that has been withdrawn, and generate a signal indicative of the withdrawn length;
a seatbelt buckle assembly, including:
a housing; and
an alarm assembly including at least one of a light source and an annunciator; and
a controller associated with at least one of the seatbelt payout sensor and the alarm assembly, and configured to:
receive the signal generated by the seatbelt payout sensor;
determine whether the withdrawn length of the seatbelt is within a predetermined range; and
control the alarm assembly to selectively generate at least one of a visible signal and an audible signal to remind an operator regarding employment of the seatbelt based on the determination.

2. The operator restraint system of claim 1, wherein the seatbelt payout sensor includes a rotation counter associated with the seatbelt spool and configured to measure the withdrawn length of the seatbelt.

3. The operator restraint system of claim 1, wherein the seatbelt payout sensor includes a magnetic element embedded at a predetermined location in the seatbelt, and a magnetic switch disposed adjacent the seatbelt spool and configured to detect the magnetic element embedded in the seatbelt.

4. The operator restraint system of claim 1, further including a timer associated with the controller and configured to set a duration of time associated with at least one of the light source and the annunciator for selectively generating the at least one of the visible signal and the audible signal.

5. The operator restraint system of claim 1, wherein the controller is further configured to determine whether the withdrawn length of the seatbelt is within the predetermined range after determining that the seatbelt is secured with the seatbelt buckle assembly, and to control the alarm assembly to selectively generate the at least one of the visible signal and the audible signal based on the determination.

6. The operator restraint system of claim 1, wherein at least a portion of the light source is disposed within the housing, and the annunciator is associated with the housing.

7. The operator restraint system of claim 1, further including an engagement detection device configured to detect whether the seatbelt is secured with the seatbelt buckle assembly.

8. An operator restraint system, comprising:
a seatbelt payout sensor located adjacent a seatbelt spool and configured to measure a length of a seatbelt that has been withdrawn, and generate a signal indicative of the withdrawn length;
a seatbelt buckle assembly, including:
a housing; and
an alarm assembly including a light source configured to generate a visible signal and an annunciator configured to generate an audible signal, the light source and the annunciator being associated with the housing; and
a controller associated with at least one of the seatbelt payout sensor, and at least one component of the alarm assembly, and configured to:
receive the signal indicative of the withdrawn length of the seatbelt generated by the seatbelt payout sensor;
determine whether the withdrawn length of the seatbelt is within a predetermined range; and
control at least one component of the alarm assembly to selectively generate an alarm to remind an operator regarding employment of the seatbelt based on the determination.

9. The operator restraint system of claim 8, wherein the seatbelt payout sensor includes a rotation counter associated with the seatbelt spool and configured to measure the withdrawn length of the seatbelt.

10. The operator restraint system of claim 8, wherein the seatbelt payout sensor includes a magnetic element embedded at a predetermined location in the seatbelt, and a magnetic switch disposed adjacent the seatbelt spool and configured to detect the magnetic element embedded in the seatbelt.

11. The operator restraint system of claim 8, further including a timer associated with the controller and configured to set a duration of time associated with at least one of the light source and the annunciator for selectively generating the alarm.

12. The operator restraint system of claim 8, wherein the controller is further configured to determine whether the withdrawn length of the seatbelt is within the predetermined range after determining that the seatbelt is secured with the seatbelt buckle assembly, and to control at least one component of the alarm assembly to selectively generate the alarm based on the determination.

* * * * *

UNITED STATES PATENT AND TRADEMARK OFFICE
Certificate

Patent No. 8,195,365 B2                                                                                        Patented: June 5, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James Robert Bernhagen, Cary, NC (US); Robert Quincy Elliott, Cary, NC (US); John Martin Hadank, Peoria, IL (US); David James Edwards, Dunlap, IL (US); and John C. Spangler, Pekin, IL (US).

Signed and Sealed this Second Day of July 2013.

<div style="text-align:right">

PAUL N. DICKSON
*Supervisory Patent Examiner*
Art Unit 3616
Technology Center 3600

</div>